Oct. 16, 1945.　　　　D. INGALLS　　　　2,386,862
FLEXIBLE CONNECTION
Filed Aug. 3, 1940
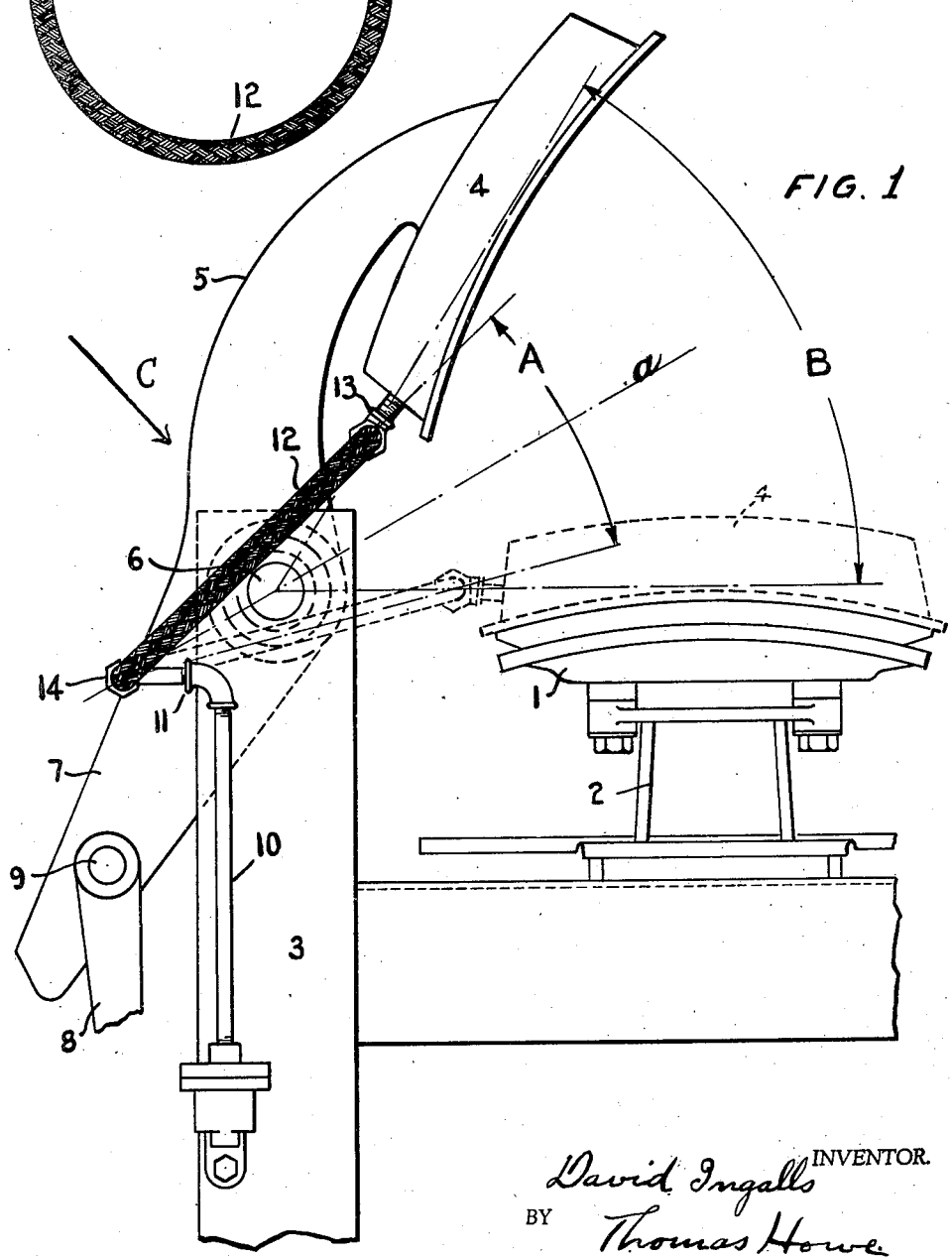

Patented Oct. 16, 1945

2,386,862

UNITED STATES PATENT OFFICE 2,386,862

FLEXIBLE CONNECTION

David Ingalls, Westfield, N. J., assignor to Titeflex, Inc., Newark, N. J., a corporation of New Jersey Application August 3, 1940, Serial No. 350,175

4 Claims. (Cl. 38—36)

This invention relates to the connection of flexible fluid conduits between relatively movable parts.

The main object of the invention is to provide flexible, fluid conduits between relatively movable parts whereby swivel joints are avoided and the parts are so relatively arranged and constructed that the conduit will function efficiently and effectively.

While the invention may have other applications its use is especially contemplated in connection with the well known laundry pressers for pressing clothing, such pressers comprising a lower member on which the clothing is laid and an upper member, pivoted to the lower, which is brought down upon the clothing to press the same.

The upper movable member is usually steam heated and in the past steam has been supplied to it through steam piping provided with swivel couplings to permit movement of the member. The swivel couplings, however, were liable to become leaky, were soon worn out and were otherwise objectionable. To avoid swivel couplings, a flexible conduit was provided for connecting the stationary steam pipe to the movable presser member. Such flexible conduit was, however, subject to damaging or deleterious strains and was undesirable in operation. According to the present invention, the flexible conduit is so arranged and constructed with relation to its cooperating parts, that it is effective and efficient in operation without the objections above referred to.

To this end the flexible conduit is fixed at one end to the stationary steam supply pipe and at the other end is fixed to the movable member, the flexible conduit being in the form of a U-shaped loop which is substantially perpendicular to the plane of movement of the movable end of the loop about the axis of its stationary end. This provides a desirable form of connection but under some circumstances and particularly where the connection is a conduit which requires relief from twisting stresses for durability and efficient operation, injurious and undesirable twisting may be avoided by properly relating the angle of movement of the movable end of the loop about the stationary end of such loop, to the angle of movement of the movable presser member about the pivot, the avoidance of twisting of the conduit may be accomplished by making the angle of movement of the movable loop end about the axis of the stationary end of the loop, one-half of the angle of movement of the movable loop end about the axis of the pivotal connection of the movable presser member with the stationary presser member. With this arrangement the flexible conduit is relieved of twist and movement of the movable presser member is permitted by longitudinal flexing of the conduit distributed along its length, and all of the parts work together harmoniously in an efficient manner and without danger of imposing deleterious stresses upon the parts.

Other and ancillary objects of the invention will appear hereinafter.

In the accompanying drawing which illustrates the invention:

Fig. 1 is a side elevation, partly broken away, of laundry presser apparatus embodying the invention; and Fig. 2 is a plan view of the flexible conduit forming a steam connection for the movable member of the presser looking in the direction of the arrow C.

Referring to the drawing, the apparatus therein shown is of a well known type used for pressing clothes and the like. Such a machine, as is well known, comprises a lower stationary presser member 1 with a pivoted upper presser member 4 which may be moved toward the lower member to press the clothing between such members, the upper member being movable away from the lower on its pivot so as to release the clothing. The upper member is steam heated.

In the apparatus of the drawing, the lower presser member 1 is stationarily mounted on the pedestal 2 carried on a support 3. The upper member 4 is carried by an arm 5 pivoted at 6 in the support 3. The arm 5 has the tail piece 7 extending upon the opposite side of the pivot 6 and the presser member 4 may be moved about its pivot 6 by means of a link 8 pivoted to the tail 7 at 9, such link being operated by a treadle or other suitable means.

Steam may be supplied to the presser member 4 from the stationary steam supply pipe 10 through the double elbow fitting 11, which is fixedly secured to the pipe 10, the flexible conduit 12 and the elbow fitting 13 fixed to the member 4. The axes of the conduit ends where secured to the fittings 11 and 13 are substantially perpendicular to the plane of movement of the movable conduit end about the axis of the stationary conduit end as the presser member 4 is turned on its pivot. The axes of the ends of the flexible conduit 12 and the axis of the pivotal connection of the member 4 are substantially parallel and the pivotal axis of the member 4 is between the axes of the conduit at its ends. The flexible conduit may be of any suitable construction, but a construction which is especially adapted to the use as indicated is formed by a helically disposed metal strip having a central longitudinal fold or groove forming a corrugation in the completed tube, the edges of adjacent convolutions being fixedly secured together in a fluid-tight manner and flexibility of the tube being provided by bending in the corrugations. About the tube is a braid formed of braided metal strips the ends of the braid and also the ends of the corrugated tube being secured to the end couplings. Such conduit is as shown in Fig. 5 of and as described in the United States Patent No. 1,340,818, Louis H. Brinkman, patented May 18, 1920. The flexible conduit comprising the flexible corrugated tube and the outer braided covering has one end fixedly secured to the fitting 11 and its other end fixedly secured to the fitting 13, no swivel joint being provided but movement of the presser member 4 being permitted by the flexibility of the conduit 12.

It will be observed that the flexible connection 12 is substantially in a plane perpendicular to the plane of movement of its movable end about the axis of its stationary end.

While the conduit 12 flexes to permit movement of the presser member 4 about its pivot 6, unless the mounting and relationship of this flexible conduit to the moving parts is properly adjusted, the conduit may be subjected to torsional or other strains which are deleterious to it. By making the angle A of movement of the movable end of the loop 12 about its stationary end 14, one-half of the angle B, which is the movement of the movable end of the loop about the axis of the pivot 6 of the presser member 4, the conduit 12 will be relieved of twisting and other deleterious forces during the movement of the presser member 4, and such movement will be permitted by longitudinal flexing of the conduit distributed along its length so that the whole will work together harmoniously and the flexible conduit will not be placed under any deleterious strain.

It will be observed that the line $a$ through the center of the stationary end of the flexible conduit 12 and the center of the pivot 6, bisects the angle A of relative movement of the movable end of the flexible conduit about its stationary end and also bisects the angle B of movement of the movable conduit end about the pivot 6.

While the invention has been illustrated in what is considered its best application it may have other embodiments without departing from its spirit and is not therefore limited to the structure shown in the drawing.

What I claim is:

1. The combination with a clothes presser comprising a stationary presser member and a movable presser member pivoted to the stationary member, of means for supplying steam to said movable presser member comprising a stationary steam conduit and a flexible conduit having one end fixed to said steam conduit and the other end fixed to said pivoted presser member, the said flexible conduit being in the form of a loop and having its axes at its ends substantially parallel to each other and substantially perpendicular to the plane of movement of the movable end of said flexible conduit about the axis of the stationary end of said flexible conduit, the said axes of the ends of said conduit and the pivotal axis of said movable presser member being substantially parallel, said pivotal axis being between the axes of the ends of said flexible conduit and the angle of movement of the end of said flexible conduit fixed to said presser member about the axis of the stationary end of said flexible conduit, being substantially one-half of the angle of movement of the end of the flexible conduit fixed to said movable member, about the pivotal axis of said movable presser member.

2. The combination with stationary and pivoted members, of a conduit connection therebetween comprising a looped flexible conduit having one end fixed to said stationary member and the other end fixed to said pivoted member, the end of said looped flexible conduit which is fixed to said pivoted member being movable about the axis of its stationary end to permit the movement of the pivoted member upon its pivot, the axes of the ends of said conduit being substantially parallel to each other and perpendicular to the plane of movement of the movable end of said conduit about the axis of the stationary end of said conduit and the axes of the ends of said conduit being substantially parallel to the pivotal axis of said pivoted member, the angle of movement of the movable end of said flexible conduit about the axis of its stationary end being substantially one-half the angular movement of the movable end of said flexible conduit about the pivotal axis of said pivoted member, said pivotal axis lying between the axes of the ends of said conduit.

3. A flexible tube connection from a stationary member to a pivoting member comprising a flexible tube having attached end fittings, one fitting being secured to the stationary member, the other fitting being secured to the pivoting member, the tubing being arranged in a "U" bend with the longitudinal axes of the fittings parallel to each other and to the pivotal axis of said pivoting member, the pivotal axis being substantially midway between the ends of the tubing.

4. A flexible tube connection from a stationary member to a pivoting member comprising a flexible tube having attached end fittings, one fitting being secured to the stationary member, the other fitting being secured to the pivoting member, the tubing being arranged in a "U" bend with the longitudinal axes of the fittings parallel to each other and to the pivotal axis of said pivoting member, the angular displacement during pivoting of a line drawn through the axes of the fittings and at right angles thereto being substantially one half of the angular displacement during pivoting of a line drawn through the pivotal axis and the longitudinal axis of the fitting secured to the pivoting member at right angles thereto.

DAVID INGALLS.